(12) United States Patent
Chuang

(10) Patent No.: US 6,615,956 B1
(45) Date of Patent: Sep. 9, 2003

(54) BRAKE AND LOCK DEVICE

(76) Inventor: Louis Chuang, 7F-8, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 10/122,827

(22) Filed: Apr. 15, 2002

(51) Int. Cl.[7] .............................. B62H 5/14; B62L 3/06
(52) U.S. Cl. ................ 188/24.18; 188/24.22; 70/226
(58) Field of Search ............... 70/226, 228, 2 D; 188/24.11–24.22

(56) References Cited

U.S. PATENT DOCUMENTS

| 4,708,004 A | * | 11/1987 | Allen ........................... 70/226 |
| 5,887,486 A | * | 3/1999 | Lin et al. ...................... 74/489 |

* cited by examiner

Primary Examiner—Christopher P. Schwartz
(74) Attorney, Agent, or Firm—Alan D. Kamrath; Rider Bennett, LLP.

(57) ABSTRACT

A brake and lock device includes a lever pivotally connected with a fork of a bicycle, a brake shoe attached to the lever for braking a wheel and a lock attached to the lever for locking the wheel. The lock includes a core for receiving a key and a latch connected with the core for locking the wheel. The core includes a first end for receiving the key and a second end connected with the latch. The first end of the core defines a keyhole. The core includes a mandrel extending from the second end thereof for connection with the latch. The latch defines a recess for receiving the mandrel and two holes in communication with the recess. The mandrel defines a hole. A pin can be inserted through the holes defined in the latch and in the mandrel. The latch may include a protective sleeve mounted thereon. The mandrel can be rotated so that the latch can be pivoted to interfere with spokes of a wheel mounted in the fork.

17 Claims, 6 Drawing Sheets

BRAKE AND LOCK DEVICE

BACKGROUND OF INVENTION

1. Field of Invention

The present invention is related to a bicycle and more particularly to a brake and lock device for use on a bicycle.

2. Related Prior Art

People ride bicycles for transportation and/or sports. Bicycles can be parked easily and entail almost no pollution for the environment However, bicycles can be easily stolen since they are light in weight. Therefore, a lot of locks have been devised to lock bicycles.

Taiwanese Patent Publication No. 411922 discloses a lock for bicycles. A bicycle includes a front fork consisting of a shank and two prongs extending from the shaft. A front wheel is mounted on an axle secured to the prongs of the front fork. The lock includes a horseshoe-shaped frame. Two plates are riveted to two ends of the horseshoe-shaped frame, respectively. Each of the plates defines a slot. An upper plate is riveted to a middle portion of the horseshoe-shaped frame. Two stops are raised from the upper plate. A lower end of a sheath in which a braking cable extends is restricted by means of the stops. A bolt can be inserted through the slot defined in each of the plates and a hole defined in a bracket for a brake shoe for engagement with a socket formed on each of the prongs of the front fork. Thus, the horseshoe-shaped frame and the brackets are mounted on the front fork. Several problems have been encountered in use of this conventional lock. Firstly, it adds a lot of weight to a bicycle. Secondly, it is troublesome to install because the brackets must be removed from the fork beforehand. Thirdly, it is troublesome to use because operation of the lock can be hindered by one of the brackets.

The present invention is therefore intended to obviate or at least alleviate the problems encountered in the prior art.

SUMMARY OF INVENTION

It is an objective of the present invention to provide a brake and lock device.

According to the present invention, a brake and lock de,ice includes a lever pivotally connected with a fork of a bicycle, a brake shoe attached to the lever for braking a wheel and a lock attached to the lever for locking the wheel.

The lock includes a core for receiving a key and a latch connected with the core for locking the wheel. The mandrel can be rotated so that the latch can be pivoted.

The core includes a first end for receiving the key and a second end connected with the latch. The first end of the core defines a keyhole. The core includes a mandrel extending from the second end thereof for connection with the latch.

The latch defines a recess for receiving the mandrel and two holes in communication with the recess. The mandrel defines a hole. A pin can be inserted through the holes defined in the latch and in the mandrel.

The latch may include a protective sleeve mounted thereon.

The lever includes a casing formed thereon for receiving the core. The casing includes a cylindrical portion integrated with an annular portion defining a hole through which the mandrel extends.

Other objectives, advantages, and novel features of the invention will become more apparent from the following detailed description when taken in conjunction with the attached drawings.

BRIEF DESCRIPTION OF DRAWINGS

The present invention is described through detailed illustration of embodiments referring to the attached drawings wherein.

DETAILED DESCRIPTION OF EMBODIMENTS

Figure 4:
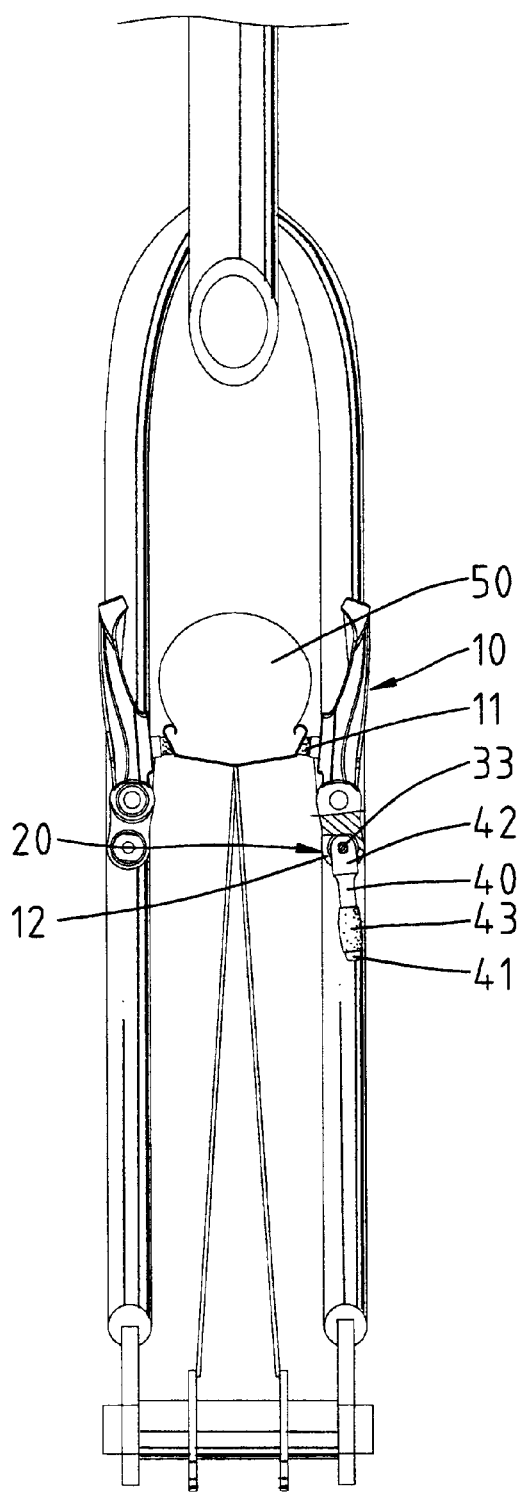
FIG. 4 is an elevation of a front fork connected with the brake and lock device shown in FIG. 1.
Figure 5:
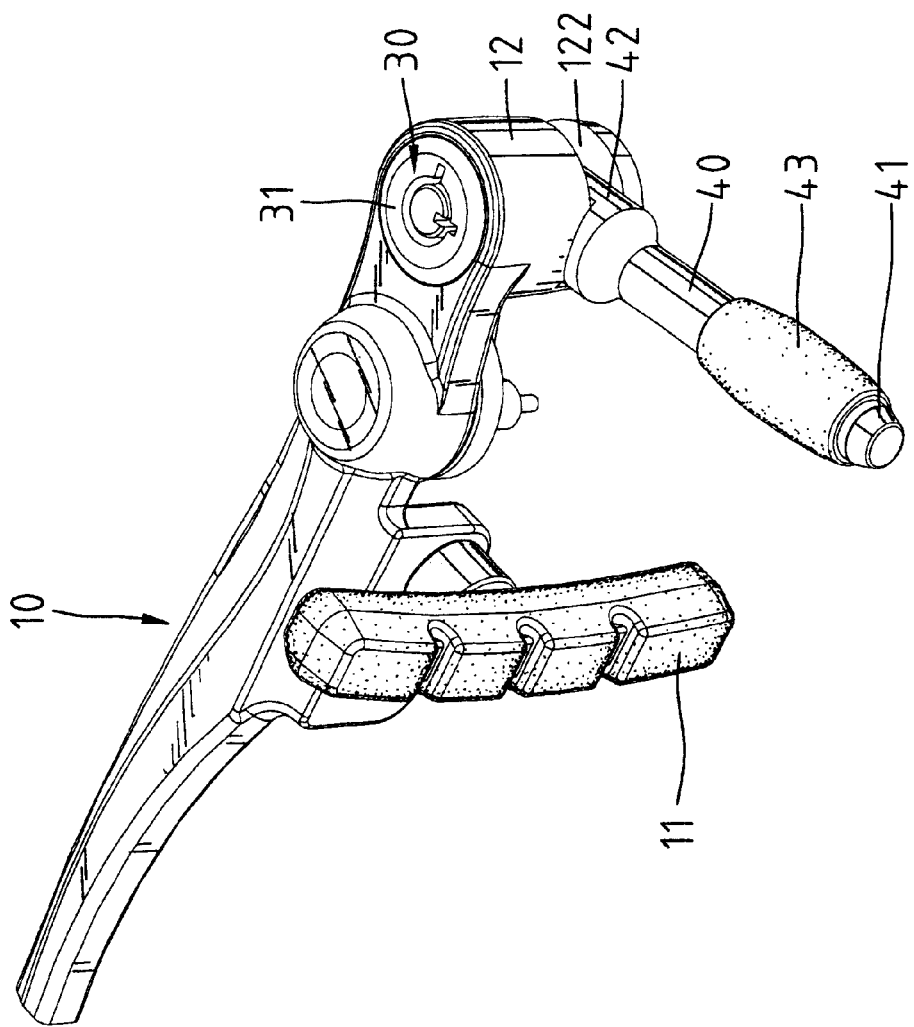
FIG. 5 is a perspective view of the brake and lock device according to the present invention in a locking position.
Figure 6:
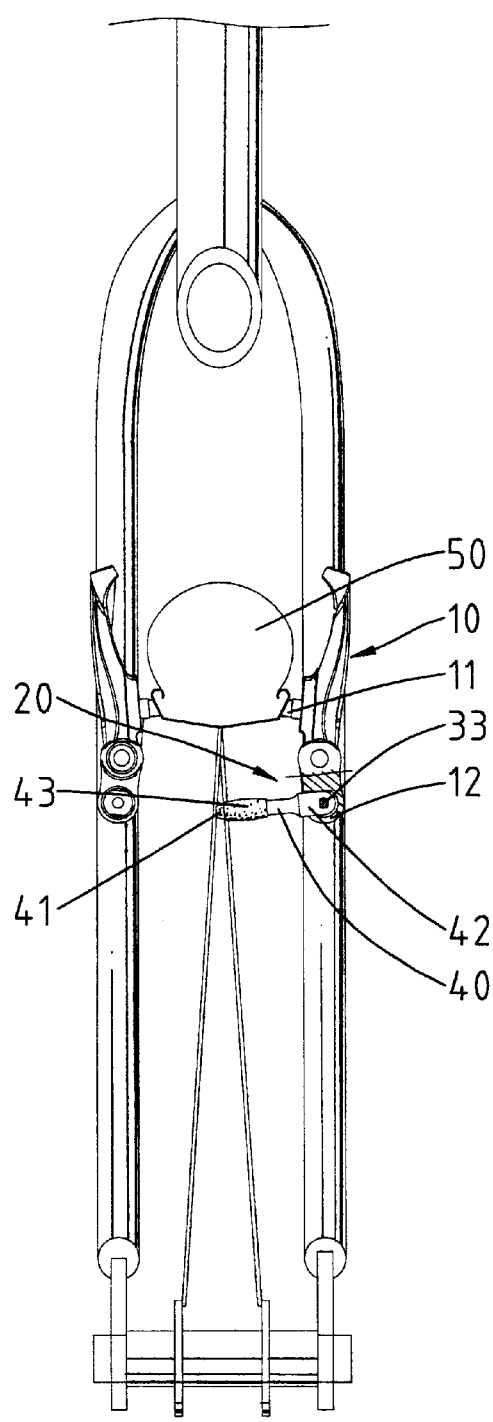
FIG. 6 is an elevation of a front fork connected with the brake and lock device shown in FIG. 5.

FIGS. 4 and 6 show a front fork (not numbered) of a bicycle (not shown). The front fork includes a shank and two prongs extending from the shank. A brake and lock device according to the present invention is mounted on the front fork for braking and locking the bicycle.

The brake and lock device includes two levers 10. Each lever 10 is pivotally linked to each prong of the front fork. A brake shoe 11 is attached to each lever 10. The brake shoe 11 can exert a frictional force on a side of a rim mounting a bicycle tire 50.

As shown in FIGS. 4 and 6, only one lever 10 is equipped with a lock 20. Therefore, description will only be given to the lever 10 equipped with the lock 20 referring to FIGS. 1–3 and 5. Referring to FIGS. 4 and 6, the lock 20 is mounted on the lever 10 on the right hand side; however, the lock 20 can be installed on the lever 10 on the left hand side.

Figure 1:
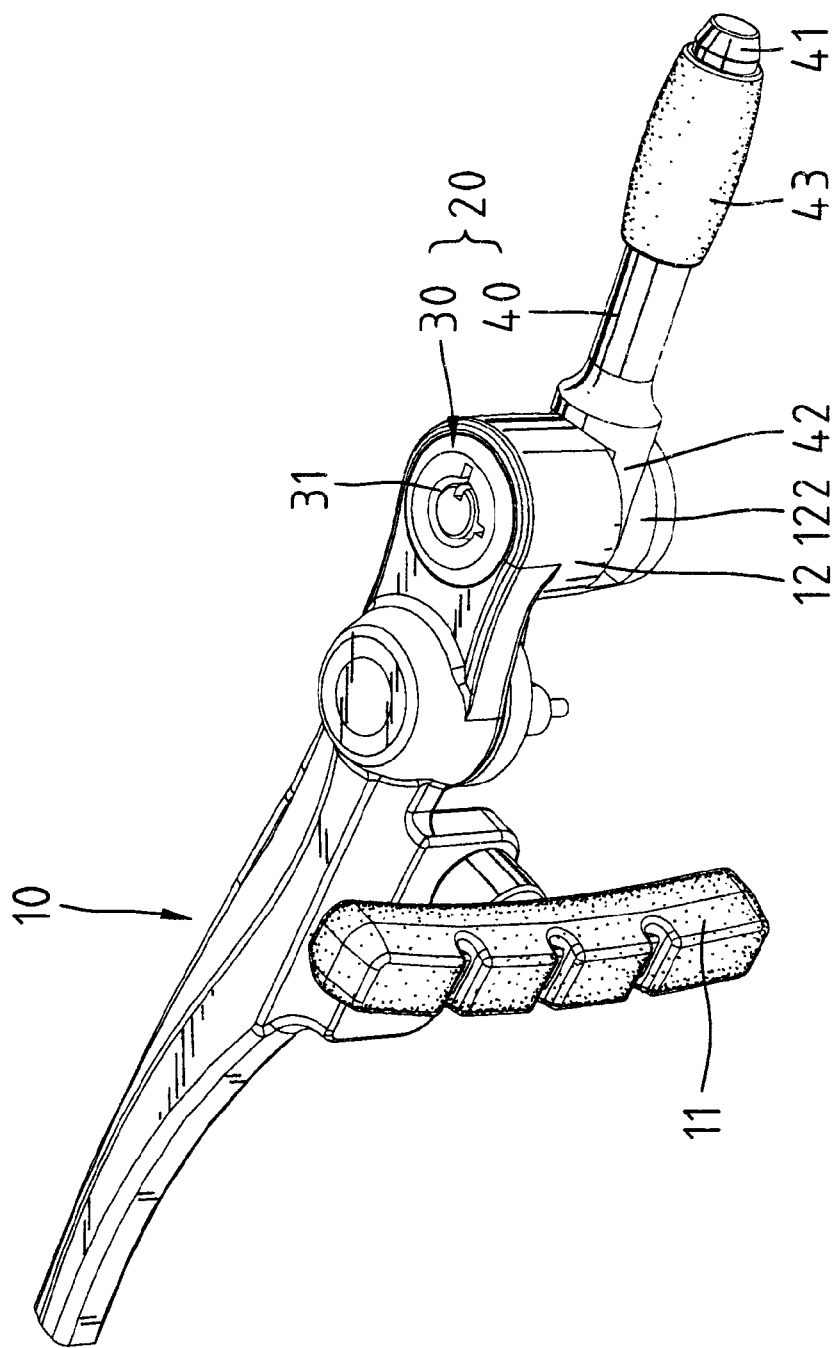
FIG. 1 is a perspective view of a brake and lock device according to the present invention in a releasing position.
Figure 2:
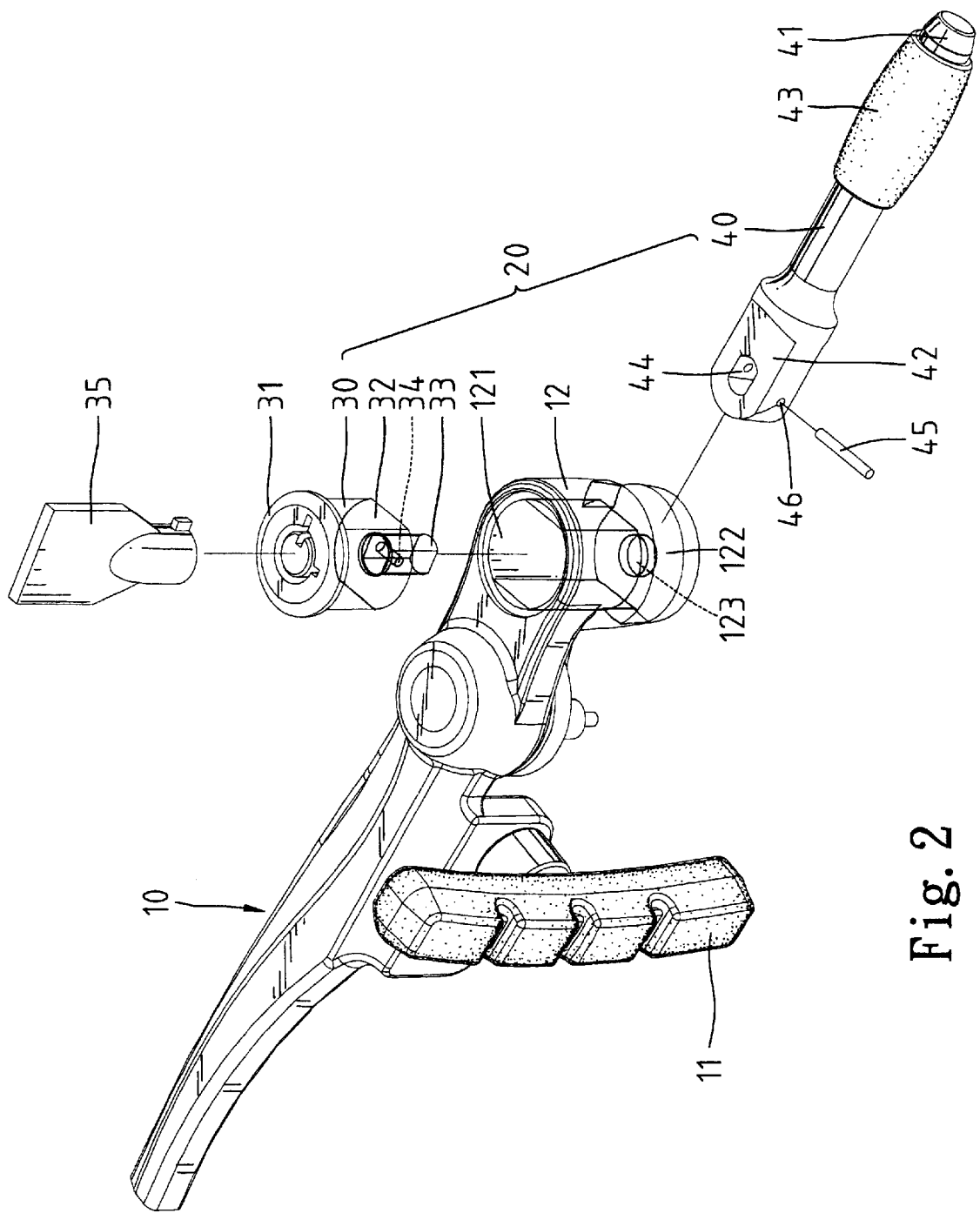
FIG. 2 is an exploded view of the brake and lock device shown in FIG. 1.
Figure 3:
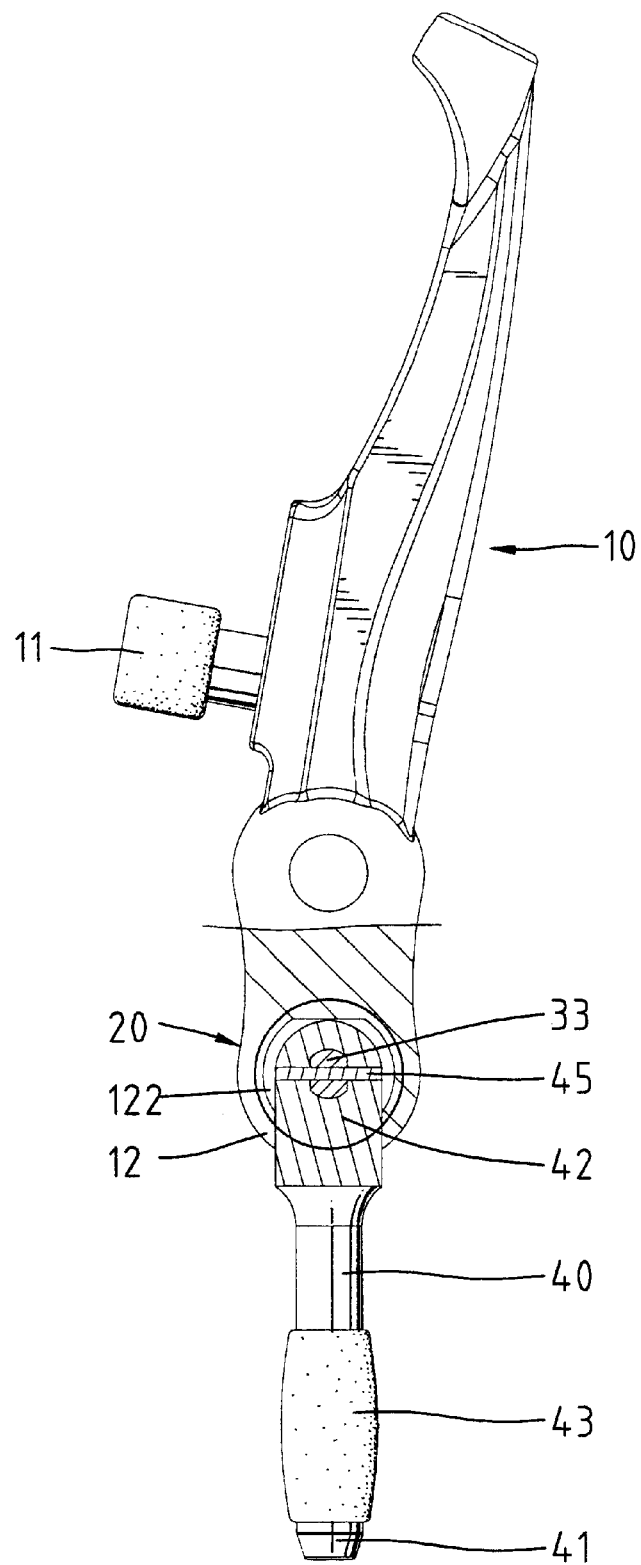
FIG. 3 is a partially cross-sectional view of the brake and lock device shown in FIG. 1.

Referring to FIGS. 1–3, the lock 20 is mounted on the lever 10 opposite to the brake shoe 11. The lever 10 is formed with a casing 12 including a cylindrical portion 121 integrated with an annular portion 122 defining a hole 123.

A core 30 includes a first end 31 defining a keyhole (not numbered) and a second end 32 from which a mandrel 33 extends. A hole 34 is defined in the mandrel 33. A key 35 can be inserted in the keyhole in order to rotate the mandrel 33.

A latch 40 includes a first section 41 and a second section 42. A flexible protective sleeve 43 is mounted on the first section 41 of the latch 40. The second section 42 of the latch 40 defines a recess 44 corresponding to the mandrel 33. The second section 42 of the latch 40 defines two holes 46 in communication with the recess 44.

In assembly, the core 30 is received in the casing 12. The mandrel 33 extends through the hole 123 for insertion in the recess 44. A pin 45 is inserted in the holes 46 and 34, thus retaining the casing 12, core 30 and the latch 40 assembled.

In use, the key 35 can be inserted in the keyhole in order to pivot the latch 40 from the position shown in FIG. 4 to the position shown in FIG. 6. In the position shown in FIG. 6, the latch 40 interferes with a spoke, thus preventing a front wheel from rotation.

Some embodiments of the present invention have been described in detail for illustration of the present invention. Those skilled in the art can derive a lot of variations from these embodiments. Therefore, these embodiments shall not limit the scope of the present invention that is defined in the attached claims.

What is claimed is:

1. A brake and lock device includes a lever pivotally connected with a fork of a bicycle, a brake shoe attached to the lever for braking a wheel and a lock attached to the lever for locking the wheel, wherein the lock includes a core for receiving a key and a latch connected with the core for locking the wheel, with the latch positionable to interfere with the rotation of the wheel, wherein the core includes a first end for receiving the key and a second end connected with the latch, wherein the core includes a mandrel extending from the second end thereof for connection with the latch, and wherein the mandrel can be rotated about an axis so that the latch can be pivoted about the axis of the mandrel by the rotation of the mandrel.

2. The brake and lock device according to claim 6 wherein the first end of the core defines a keyhole.

3. The brake and lock device according to claim 2 wherein the latch defines a recess for receiving the mandrel.

4. The brake and lock device according to claim 3 including a pin wherein the mandrel defines a hole, wherein the latch defines two holes in communication with the recess, wherein the pin can be inserted through the holes defined in the latch and in the mandrel.

5. The brake and lock device according to claim 1 wherein the latch defines a recess for receiving the mandrel.

6. The brake and lock device according to claim 5 including a pin wherein the mandrel defines a hole, wherein the latch defines two holes in communication with the recess, wherein the pin can be inserted through the holes defined in the latch and in the mandrel.

7. The brake and lock device according to claim 1 wherein the lever includes a casing formed thereon for receiving the core.

8. The brake and lock device according to claim 7 wherein the casing includes a cylindrical portion integrated with an annular portion defining a hole through which the mandrel extends.

9. The brake and lock device according to claim 1 wherein the latch includes a protective sleeve mounted thereon.

10. A lock device connected to a fork holding a bicycle wheel having a radial extent, with the lock device comprising, in combination: a lock of a generally L-shape including a mandrel having a first end and a second end and a latch connected to the second end of the mandrel, with the mandrel being pivotal relative to the fork about a mandrel axis defined by the mandrel, with at least the second end of the mandrel being within the radial extent of the bicycle wheel, with the mandrel positioned in a noninterfering position with rotation of the bicycle wheel, with the latch being within the radial extent of the bicycle wheel, with the latch being positionable between a first noninterfering position with rotation of the bicycle wheel and a second interfering position with rotation of the bicycle wheel with the latch being positionable in the first noninterfering position and the second interfering position by pivoting of the mandrel relative to the fork.

11. The lock device according to claim 10 further comprising, in combination: a core received in a cylindrical portion having a first open end and a second end integrated with an annular portion defining a hole, with the core including a flange for abutting with the first open end of the cylindrical portion, with the mandrel being rotatably received within the core and extending through the hole of the annular portion, with the latch being removably connected to the mandrel, with the latch abutting with the annular portion.

12. The lock device according to claim 11 further comprising, in combination: an insertable key for rotating the mandrel inside of the core.

13. The lock device according to claim 12 with the latch defining a recess for receiving the mandrel; and a pin inserted through holes defined in the latch and the mandrel for connecting the latch to the mandrel.

14. The lock device according to claim 10 with the fork including a lever having a brake shoe for braking the bicycle wheel, with the lever being pivotally connected to the fork about a lever axis, with the mandrel being pivotally mounted to the lever about the mandrel axis spaced from and parallel to the lever axis.

15. The lock device according to claim 10 with the first noninterfering position and the second interfering position being spaced 90° around the mandrel axis.

16. The lock device according to claim 10 with the latch including a protective sleeve mounted thereon.

17. A lock device connected to a fork holding a bicycle wheel, with the lock device comprising, in combination: a lock of a generally L-shape including a mandrel having a first end and a second end and a latch connected to the second end of the mandrel, with the mandrel being pivotal relative to the fork about a mandrel axis defined by the mandrel, with the mandrel positioned in a noninterfering position with rotation of the bicycle wheel, with the latch being positionable between a first noninterfering position with rotation of the bicycle wheel and a second interfering position with rotation of the bicycle wheel with the latch being positionable in the first noninterfering position and the second interfering position by pivoting of the mandrel relative to the fork, with the first noninterfering position and the second interfering position being spaced 90° around the mandrel axis.

* * * * *